(12) United States Patent
Unitt et al.

(10) Patent No.: US 6,970,461 B2
(45) Date of Patent: Nov. 29, 2005

(54) ACCESS CONTROL ENHANCEMENTS FOR DELIVERY OF VIDEO AND OTHER SERVICES

(75) Inventors: Brian Unitt, Bishops Stortford (GB); Michael Grant, Bishops Stortford (GB); Julian Cable, Bishops Stortford (GB); Lou Pino, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 708 days.

(21) Appl. No.: 09/725,360

(22) Filed: Nov. 29, 2000

(65) Prior Publication Data

US 2004/0240466 A1   Dec. 2, 2004

(51) Int. Cl.[7] ............................................. H04L 12/26
(52) U.S. Cl. ....................................... 370/390; 725/27
(58) Field of Search ............. 370/390, 392; 725/27–29, 725/86

(56) References Cited

U.S. PATENT DOCUMENTS 6,009,099 A * 12/1999 Lewis et al. ................. 370/397
2003/0220100 A1 * 11/2003 McElhatten et al. ......... 455/418

FOREIGN PATENT DOCUMENTS

| EP | 0 779 724 A1 | 6/1997 | ........... H04L 12/46 |
| EP | 0888 029 A2 | 6/1998 | .......... H04Q 11/04 |
| EP | 0 902 569 A1 | 3/1999 | ........... H04L 12/18 |
| EP | 0 994 600 A2 | 4/2000 | ........... H04L 12/18 |
| WO | WO 00/48361 | 8/2000 | ........... H04L 12/18 |

OTHER PUBLICATIONS

Internet Engineering Task Force, 'RTP Profile for Audio and Video Conferences with Minimal Control'—Schulzrinne/Casner Columbia U. / Cisco Systems, Oct. 21, 1999.

Deering S: "Host Extensions for IP Multicasting" Internet Specification RFC, XX, XX, No. 1112, Aug. 1, 1989, pp. 1-17, XP002007299.

* cited by examiner

Primary Examiner—Melvin Marcelo
(74) Attorney, Agent, or Firm—Barnes & Thornburg

(57) ABSTRACT

A method of providing secure multicast over a local access network by means of a network access unit having a channel request vetting function and a permitted channel list. Channel requests from a subscriber are vetted with respect to the permitted channel list and forwarded only if permitted. The permitted list may be dynamically updated under headend control to allow users to subscribe to, and unsubscribe from, services upon request.

13 Claims, 4 Drawing Sheets

ACCESS CONTROL ENHANCEMENTS FOR DELIVERY OF VIDEO AND OTHER SERVICES

FIELD OF THE INVENTION

The present invention relates to a method and apparatus for secure delivery of services over local access networks, and in particular shared medium access networks, and a system incorporating the same.

BACKGROUND TO THE INVENTION

This invention relates to shared medium access networks, such as satellite, LMDS, UMTS, cable modem or fibre in the loop access networks, in particular to fibre to the home (FTTH). The following description relates to FTTH, but it will easily be seen how it applies to other scenarios with similar characteristics. FTTH networks can be made more economic by sharing fibre facilities and head end equipment across a number of customers. Passive Optical Networks (PONs) fall into this category. In such a network, a single head end node, normally physically located on the network provider's premises, connects to a number of customer located outstations via a passive optical splitter (POS) which provides a fanout to (typically) 16 outstations.

Traffic transmitted in the downstream direction (from the head end to the outstations) appears at all outstations and is selected by a given outstation based on an address included in a header associated with each data packet. In the upstream direction a multiple access protocol is used to ensure that only one outstation transmits information at a time.

Such networks can be used to transmit multiple services to a customer, including video services and data services. On the customer premises an Optical Network Unit (ONU) connects to the fibre network and provides one or more interfaces to which the customer can attach end user equipment. This equipment might include one or more Set Top Boxes (STBs) for interfacing video services to a television set and one or more personal computers. Each of these devices could connect via, for example, an Ethernet interface.

The ONU will normally be supplied by the network operator who can control the software included within the ONU itself. Devices attached to the Ethernet interfaces, however, are often outside the control of the network operator and the end user may therefore be able to load software which is outside the control of the network operator.

Video services consist of television channels which can be selected for viewing by individual end users and can be classified into two categories: multicast and Video on Demand (VOD). Multicast video channels are viewed simultaneously by a number of users. Such channels may include, for example, standard broadcast channels, subscription channels (where the user pays a monthly fee for the right to view the channel whenever he wants) and pay per view channels (where the user pays to view a particular programme). VOD channels are programmes requested by a particular user and supplied only to that user. Each VOD channel requires a dedicated data path from a video server within the network. Multicast channels avoid dedicated paths from the server to each user by including multicasting features in the data path, typically using a router situated at the head end of the access network. When the first user requests a multicast channel, that channel is delivered to the head end router from the server and a connection is made through the router to the access network. If another user subsequently requests to view the same channel, a second connection is made within the router to cause the channel to be sent out on the interface to which the second user is connected. Since the second user is joining an existing channel, no additional data capacity is required on the link between the server and the router. Protocols exist for signalling from an end user device to a router to join and leave a multicast group. When the data transmission is based on Internet Protocol (IP), a multicast signalling protocol known as Internet Group Management Protocol (IGMP) may be used. Conventionally in IP networks, a multicast stream is given a destination IP address drawn from a group of addresses reserved for multicast IP packets. Similarly, when using Ethernet as the medium access control (MAC) layer, the destination MAC address is drawn from a group of addresses reserved for multicast Ethernet frames. Thus at both the IP layer and the MAC layer, the address used represents the content of the multicast data stream rather than identifying a specific destination.

An algorithm for mapping IP layer multicast addresses to MAC layer multicast addresses is given in the Internet Engineering Task Force (IETF) Request for Comment (RFC) 1112. This is a many to one mapping where a single MAC address could represent many different schemes. In systems using this mapping, the multicast channel cannot be identified uniquely at the MAC layer and the IP layer destination address must be checked to guarantee uniqueness.

In a variation of the multicast protocol, known as source specific multicast (SSM), both the source IP address and the destination IP address are required to identify uniquely a specific multicast stream. In a system using SSM the destination multicast MAC address is not guaranteed to be unique. Since current protocols do not reflect the source IP address in the source MAC address, SSM channels cannot be uniquely identified at the MAC layer and the source address at the IP layer must be checked.

A problem arises when the end user connection is a shared medium network (such as a PON): a multicast stream will be delivered to the ONUs situated on the premises of all end users on the PON whenever one of the users requests that stream and, by listening to traffic on that address, a second user would be able to view the service even though he may not have paid to receive it. This could lead to loss of revenues to the content provider which is highly undesirable.

OBJECT OF THE INVENTION

The invention seeks to provide an improved method and apparatus for overcoming one or more problems associated with the prior art.

SUMMARY OF THE INVENTION

According to one aspect of the present invention there is provided a network access unit for restricting user access to signals transmitted on a local access network and comprising: a port for receiving a channel request from a user; a channel request vetting unit for vetting the request with respect to a predetermined list of permitted channels; a transmitter for forwarding the channel request responsive to the vetting.

In one preferred embodiment the unit also comprises: a receiver arranged to receive control signals from a network headend for updating the permitted list.

In a further preferred embodiment, a time is associated with at least one channel in the predetermined list of channels and in which the channel vetting unit vets a request for the at least one channel with respect to the time.

In a further preferred embodiment, the local access network is a shared medium access network.

In a further preferred embodiment, the unit is arranged to receive signals over an optical medium.

According to a further aspect of the present invention there is provided a customer premises equipment comprising a network access unit according to claim 1.

According to a further aspect of the present invention there is provided an optical access network comprising a network access unit according to claim 1.

According to a further aspect of the present invention there is provided a content service provider server arranged for connection to a network and comprising: a transmitter for transmitting one or more content channels and channel control signals to a remote network access unit containing a permitted channel list; in which the control signals are intended to update the permitted channel list so as to control subscriber access to the transmitted content channels.

Preferably, the control signals contain time-related information for association in the permitted list with one or more channels.

The invention also provides for a telecommunications system which comprises one or more instances of apparatus embodying the present invention, together with other additional apparatus.

The invention is also directed to a method by which the described apparatus operates and including method steps for carrying out every function of the apparatus.

In particular according to a further aspect of the present invention there is provided a method of restricting user access to signals transmitted on a local access network comprising the steps of: receiving a channel request from a user at a first port; vetting the request with respect to a predetermined list of permitted channels; forwarding the request responsive to the vetting.

Preferably, the method also comprises the steps of: receiving a control signal from a network headend; updating the permitted list responsive to the control signal.

Preferably, the method also comprises the steps of: associating a time with at least one channel in the predetermined list of channels; vetting the request with respect to the time.

Preferably, the channel request is carried in an IGMP message.

According to a further aspect of the present invention there is provided a method of operating a service provider server comprising the steps of: transmitting one or more content channels and channel control signals to a remote network access unit containing a permitted channel list; in which the control signals are intended to update the permitted channel list so as to control subscriber access to the transmitted control channels.

Preferably, the method also comprises the steps of: receiving a user initiated request to change channel subscription details; transmitting a permitted channel list update signal responsive thereto to a remote network access unit associated with the user.

According to a further aspect of the present invention there is provided a use of an IGMP vetting function in customer premises equipment to provide secure multicast over a network.

According to a further aspect of the present invention there is provided a use of an IGMP vetting function and a network receive address filter in customer premises equipment to provide secure multicast over a network.

The invention is also directed to a program for a computer, comprising components arranged to perform each of the method functions.

In particular, according to a further aspect of the present invention there is provided a program for a computer on a machine readable medium arranged to: receive a channel request from a user at a first port; vet the request with respect to a predetermined list of permitted channels; forward the request responsive to the vetting.

In particular, according to a further aspect of the present invention there is provided a control signal intended for transmission to a network access unit having a permitted channel list, comprising at least one message comprising network access unit permitted channel list update information.

Preferably, the at least one message contains time-related information for association in the permitted channel list with one or more channels.

Preferably, the control signals comprise IGMP messages.

Advantageously, the aspects of the present invention provide improved security for multicast services (for example multicast video) with minimum increase in ONU complexity.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
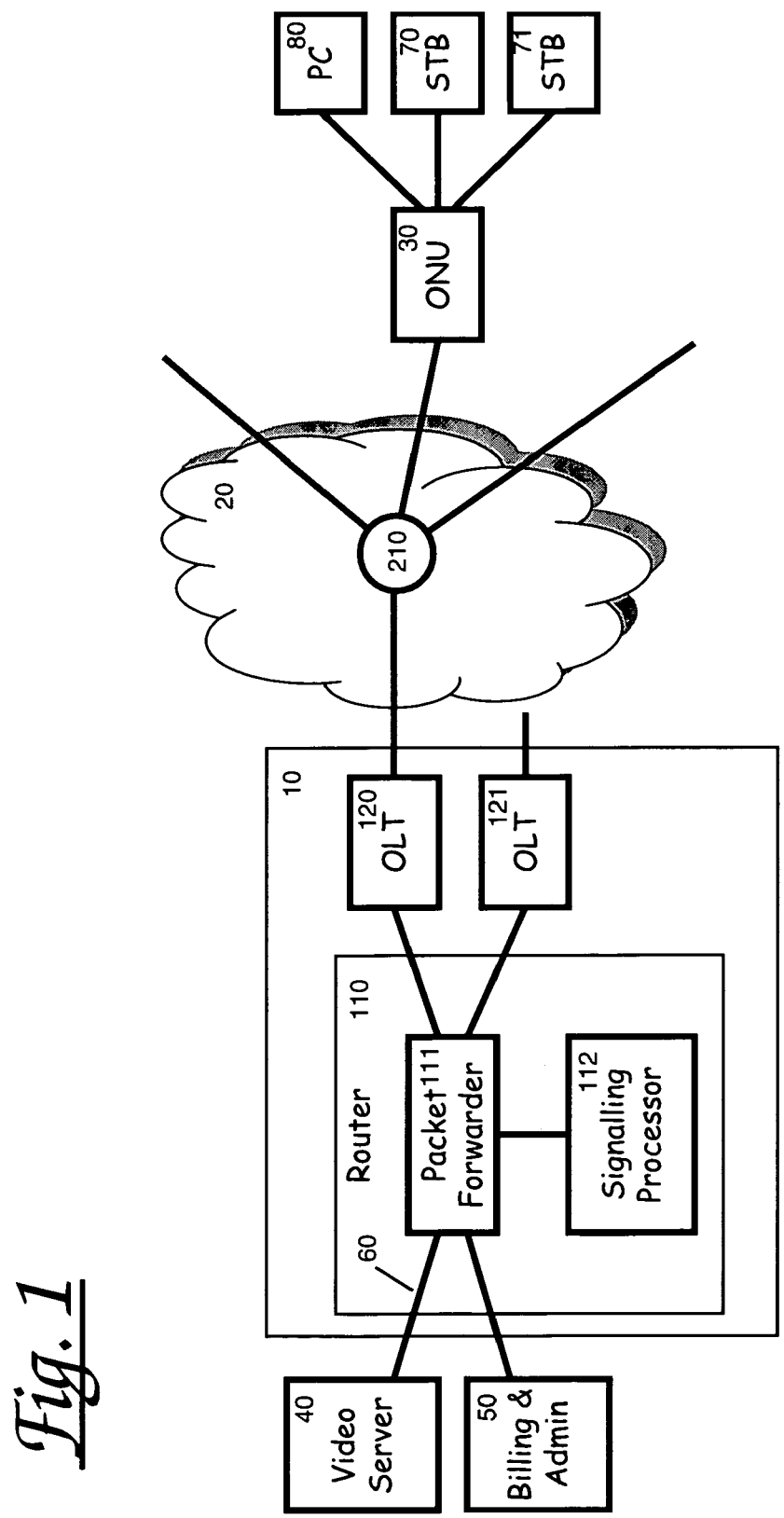
FIG. 1 shows a schematic diagram of a telecommunications network in accordance with the present invention.

Referring to FIG. 1, there is shown a system overview of one possible embodiment of an end-to-end network for delivery of multicast video services incorporating a Passive Optical Network (PON) based access network. Only those elements relevant to the present invention are shown.

The headend 10 comprises a Router 110 and one or more Optical Line Termination units (OLTS) 120–121. The Router comprises a Packet Forwarder 111 and a signal processor 112 In the downstream direction, each OLT receives packets from the router, adds any protocol and control information needed to implement the PON protocol and converts the data stream to an optical signal for transmission onto the shared optical medium 20 to one or more end users. In the upstream direction, the OLT 120 receives an optical signal which has been multiplexed onto the medium by one or more ONUs 30, and extracts the data stream to be sent to the Router for onward transmission. Optionally, the OLTs 120–121 may be physically integrated into the head end router 110.

A Video Server 40 acts as the source of multiple multicast video programmes, each of which is transmitted as a separate packet stream identified by an address in the packet header. Typically, the data link 60 to the server will be a packet switched path across an IP network. In a practical system, multiple additional servers would be used to deliver many services to the end user.

A Billing and Administration function, or unit, 50 holds information identifying which multicast streams each end user is entitled to receive.

In the example network shown, each OLT connects to an optical network incorporating a signal splitter 210 such that a single OLT is able to exchange information with multiple ONUs 30 situated on end user premises. In a preferred embodiment the signal splitter 210 is a passive optical splitter.

Each ONU may connect to one or more end user information devices such as television Set Top Boxes (STBs) 70–71 and Personal Computers (PCs) 80 for video and data applications respectively.

Figure 2:
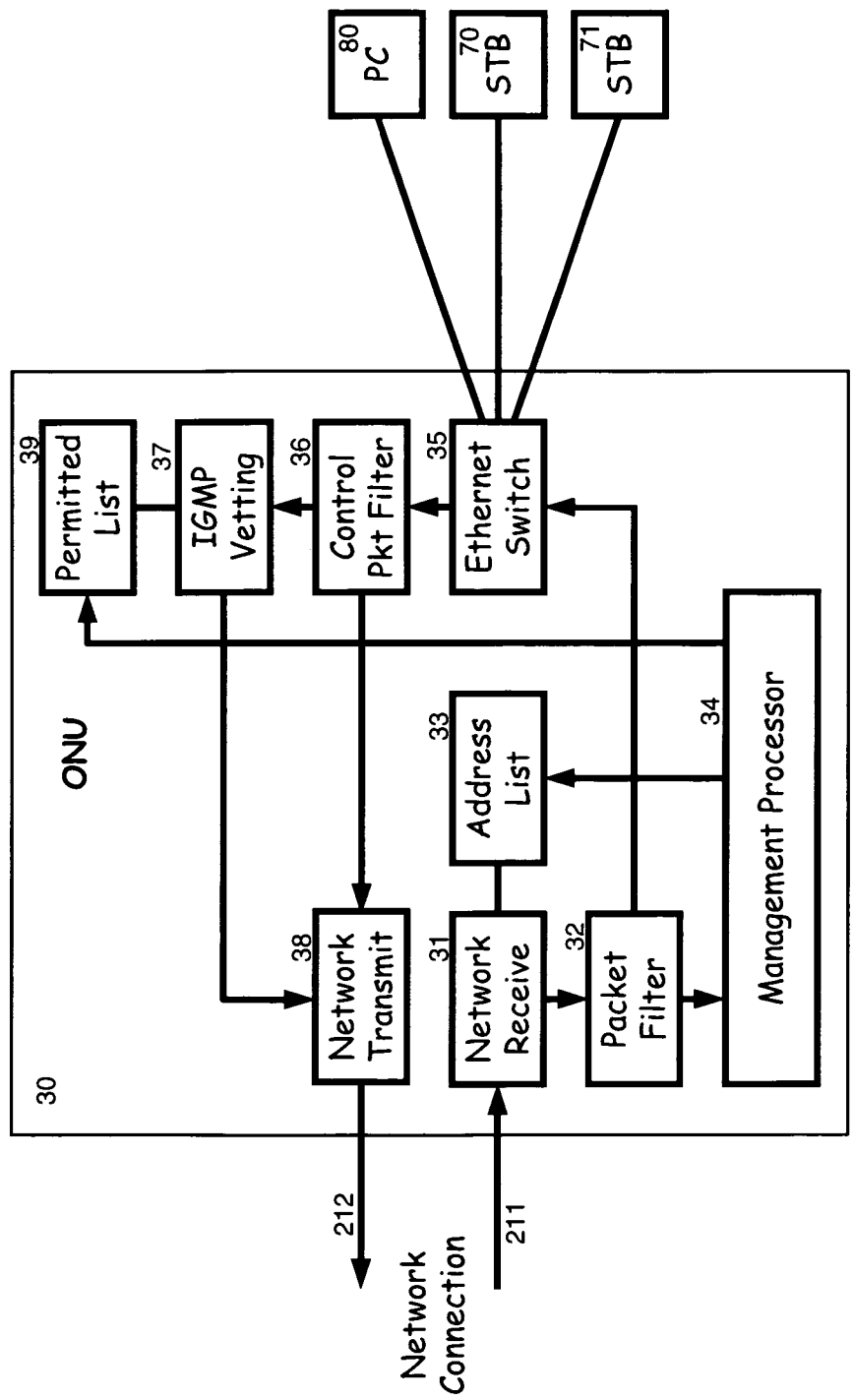
FIG. 2 shows a schematic diagram of an Optical Network Unit (ONU) in accordance with the present invention.

FIG. 2 shows an example of ONU 30 in more detail. A Network Receive function 31 converts downstream optical signals from the network connection 211 into electrical signals and passes on to the Packet Filter 32 only those information packets intended for the attached user. Other packets directed to other PON users are blocked. The addresses of packets to be passed through are contained in the Address List 33. In this arrangement, the Address List may be modified dynamically according to the video channel requested by the end user.

The Packet Filter 32 extracts from the packet stream those packets which are directed to the Management Processor function 34 within the ONU. Other packets are passed on to the Ethernet Switch 35 to which multiple end user information devices 70–71, 80 are connected.

Information packets received by the ONU from end user devices 70–71, 80 pass via the Ethernet Switch 35 to the Control Packet Filter 36. Channel change requests from the end user are encapsulated into control packets by the Set Top Box 70–71, and PC 80 and sent to the ONU. Packets recognised as multicast video control packets are extracted and passed to the IGMP Vetting function 37. Other packets are forwarded to the Network Transmit function 38 which implements the PON upstream transmission protocol and sends packets 212 via the local PON to the head end 10 at the appropriate time.

Multicast control packets sent to the IGMP Vetting function 37 are checked against the Permitted Channels list 39. If the requesting user is eligible to receive the requested channel, the IGMP Vetting function forwards the request to the head end via Network Transmit function 38.

Optionally, instead of blocking a request for a prohibited channel, the IGMP Vetting function 37 may modify the content of the request packet and forward to the network a modified request to connect the end user device to a video stream inviting the user to subscribe to the service he has requested but is not yet eligible to receive.

Forwarding the IGMP request to the headend 10 when it is not present in the permitted channel list would cause the head end router to add the stream to the composite data stream transmitted on the shared downstream medium. A malicious user could initiate many (multi-cast) channel joins, thus increasing the amount of capacity occupied on the downstream link and potentially denying service to others. Consequently, requests for channels not on the permitted channel list are preferably not forwarded.

It would be technically possible to reduce the susceptibility to denial of service attacks by intercepting IGMP messages in the head end router, but this would require non-standard features in the router and may not scale well when large numbers of customers are connected.

Unless additional capabilities are added in the ONU, as described above, theft of service can only be addressed in the router by including encryption of the multicast streams within the head end equipment using additional hardware processing data streams at the line rate of the access network. Decryption in the ONU would increase complexity in a cost-sensitive area of the system.

It is desirable that the end user should be made aware when he requests channels he is not authorised to receive.

If the user makes repeated such attempts it may also be desirable to inform the management system, either as part of a policing function or a marketing opportunity.

Optionally, if the Vetting function detects (multiple) attempts to connect to unauthorised channels, the ONU 30 may send a message to the Billing and Administration system 50.

Once it is determined that the user is eligible to receive a requested channel, the Management Processor 34 is notified and it adds to the Address List 33 the multicast address which will be used in information packets carrying data for the selected channel. Such packets are then allowed through the Network Receive function 31 and forwarded to the Ethernet Switch 34 and thence to the end user information device 70–71, 80.

In the head end router 110, IGMP messages are forwarded to a Signalling Processor 112 which instructs the Packet Forwarder 111 to add the new connection to the selected multicast stream so as to cause the stream to be forwarded to the end user via the OLT. Because the vetting function in the ONU ensures that no requests for unauthorised channels are passed to the network, no additional vetting is needed in the router.

Optionally, instead of generating IGMP messages in response to user requests to change channels, the STB 70–71, 80 may instead generate control messages in some other format which is interpreted by the ONU and translated to IGMP messages before forwarding to the OLT. The ONU then act on the interpreted messages in a way similar to that described above for incoming IGMP messages.

The Permitted List 39 is populated from the head end 10 using management messages sent as part of the downstream traffic and delivered to the Management Processor 34 via the Packet Filter 32. The permitted list may take different forms depending on the implementation, including but not limited to: a list of specific channels which the customer is eligible to receive; a list of channels the customer is to be prevented from viewing; or a set of rules to be applied to a request to determine whether a given channel is to be permitted or not. (An example of a set of rules for this last alternative can be derived from the semantics of the Unix 'hosts.allow/hosts.deny' command.)

The system is preferably based on the Internet Protocol suite. In an ONU using bridging (MAC layer forwarding) the IGMP Vetting function 37 is preferably performed using MAC addresses; in an ONU using routing (IP layer forwarding) the IGMP Vetting function 37 is preferably performed using IP addresses. To minimise ONU complexity and improve throughput, blocking of prohibited incoming multicast channels via the Network Receive function may be performed using MAC address matching.

Where the mapping from IP layer multicast addresses to MAC layer multicast addresses uses IETF RFC 1112, and the IGMP Vetting function 37 is performed using MAC addresses, the IGMP Vetting function may also optionally check the destination multicast IP address. Where the mapping from IP layer multicast addresses to MAC layer multicast addresses uses IETF RFC 1112 and blocking of prohibited incoming multicast channels via the Network Receive function is performed using MAC address matching, the Network Receive function 31 may optionally also check the IP destination address, but preferably only if the MAC layer address matching function indicates that the user may be eligible to receive the designated stream.

Where source specific multicast (SSM) is used in conjunction with IP layer vetting, the vetting function should preferably check both source and destination addresses to determine eligibility to receive a particular stream. Where SSM is used in conjunction with MAC layer vetting, the vetting function should preferably also check the IP addresses. Where SSM is used, the Network Receive function should also preferably check the IP addresses. Where SSM is used, preferably the Network Receive function should check the IP addresses only if an address match is detected at the MAC layer.

At the video IP headend, a Protocol Stack such as MPEG-2/RTP/UDP/IP/PON Multi-cast Groups may be employed. Source addresses of IP and MAC are defined and transmitted.

All available video channels may be, and ideally are, provided to the OLT. The OLT is arranged to set up and maintain receipt of all IP multi-cast channels. There may, for example be 200 channels provided by a single provider. The OLT also filters out upstream IGMP requests.

Figure 3:
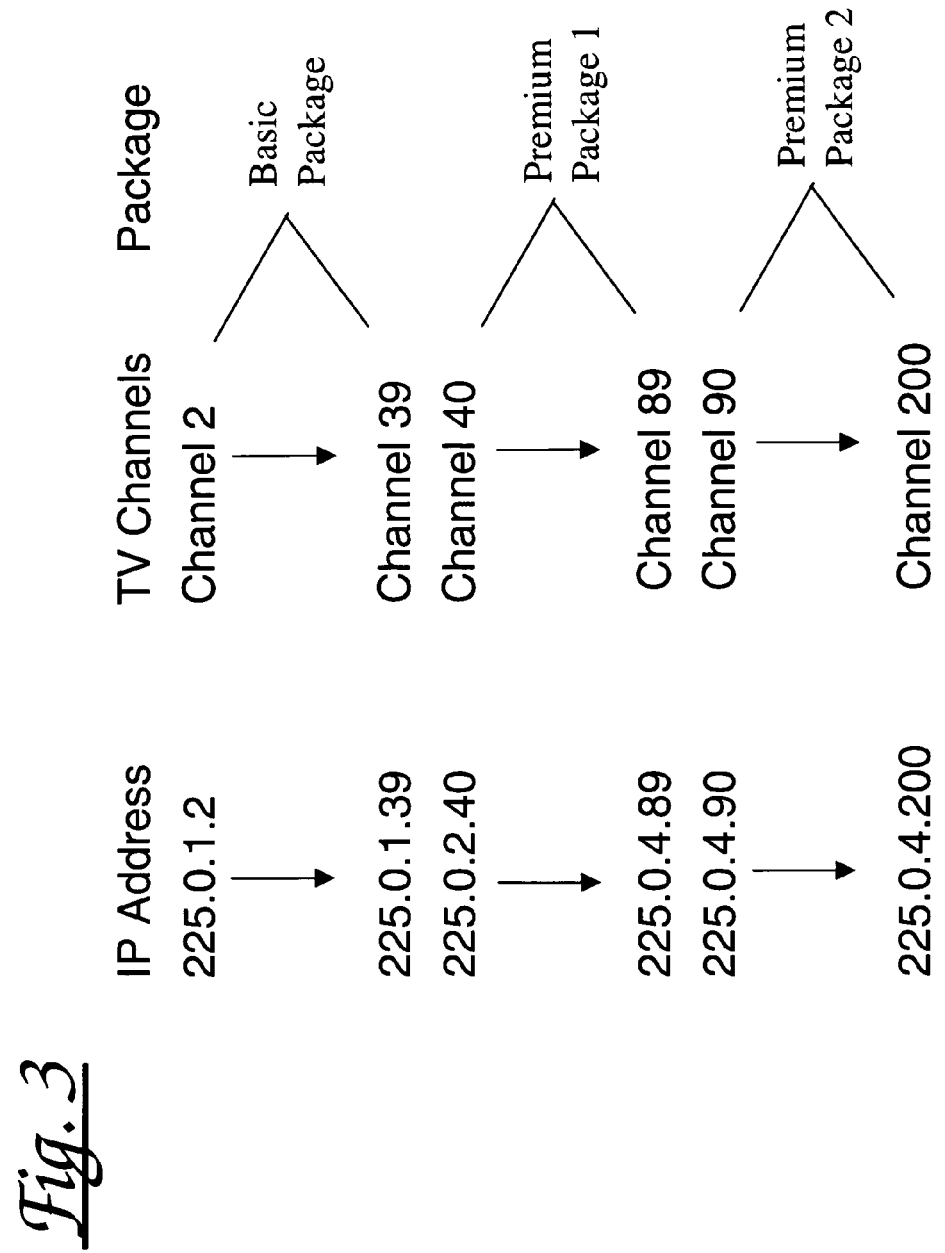
FIG. 3 shows an example of multi-cast broadcast channel packages arrangement in accordance with the present invention.

FIG. 3 shows how a set of channels may be mapped to multi-cast IP addresses. The channels may be provided, on subscription or otherwise, in groups of channels, for example as a basic packages and one or more premium rate packages.

At the set top box (STB), conventionally the allowable TV channel list is loaded by a service provider each time the STB boots up. It should be noted that this feature is for the convenience of the viewer, but does not protect the service against unauthorised access from an alternative information device such as a PC. Set top boxes preferably use IGMP version 2, or a protocol having similar functionality.

A method for handling a first channel request from a user on, for example set top box #1, comprises the steps of:
1. STB 70 requests a channel (for example channel2) by issuing a join IP multi-cast request for a specific channel IP address (for example) 225.0.1.2
2. The ONU receives IGMP join request
3. The ONU checks that the requested channel is on its list of allowable channels and sends an IGMP request for the selected channel (225.0.1.2) up to the headend unit 10 and starts listening for multicast signals on that address (225.0.1.2)
4. The headend unit 10 receives the IGMP request to join the channel (2).
   If the requested channel is already being transmitted on that link, the headend unit continues and may optionally log the IP address of the requesting STB.
   If the requested channel is not already being transmitted on that link, the requested channel is streamed on to the requesting link by the headend and optionally the IP address of the requesting STB is logged.
5. The ONU 30 receives the video packets of channel 2 and forwards these streams onto the port of the requesting STB.

An example of a method for handling a channel change request from a user on, for example set top box #1, comprises the steps of:
1. A user on STB 70 currently watching a first channel (for example channel 2) presses a channel change to watch a second channel (for example, channel 3).
2. STB 70 transmits a leave message for channel 2 (leave IP multi-cast 225.0.1.2) and a join request for channel 3 (join IP multi-cast 225.0.1.3)
3. The ONU 30 receives the IGMP leave request and sends it up to the headend 10.
4. The ONU 30 checks that channel 3 is on its list of allowable channels for that STB, and sends IGMP request for 225.0.1.3 up to the headend 10 and starts listening for transmission on the requested address (225.0.1.3).
5. The headend 10 receives the IGMP request to leave channel 2.
   If STB 70 was the only user requesting that channel on that link, transmission of that channel on that link may be suspended, and optionally the IP address of the requesting STB may be unlogged.
   If STB 70 was not the only user requesting that channel on that link, transmission of that channel on that link may continue, and optionally, the IP address of the requesting STB may be unlogged.
6. The headend 10 receives the IGMP request to join the newly requested channel (channel 3).
   If that channel was already being transmitted on that link, the headend 10 continues and optionally logs the IP address of the requesting STB 70.
   If that channel was not already being transmitted on that link, the newly requested channel (channel 3) is streamed on to the requesting link by the headend 10 and optionally the IP address of requesting the STB is logged.
7. The ONU 30 receives the video packets of the requested channel. The ONU ceases forwarding the channel 2 stream to the user and instead forwards the newly requested channel stream (channel 3) onto port of the requesting STB.

By associating a time or times with a channel in permitted list, a pay-per-view scheme can be supported as well as the pay-per-channel scheme described above. In particular, if the ONU 30 comprises a real-time clock (or has access to a periodic real-time signal from the network or elsewhere) a user may subscribe to a channel for a limited time period, for example:

the permitted list may associate a single end-time with each channel after which the channel is deleted form the permitted list, allowing immediate subscription by a user to the current channel; up to, say the end of a currently broadcast film;

the permitted list may associate both a start and end time with each channel which is then made available only between the start time and the end-time, allowing advance booking of pay-per-view services;

the permitted list may associate more complex time intervals with any given channel so as to support, for example, subscription to a particular channel only up until 9:00 p.m. where, for example, a channel provider operates a voluntary ban on transmission of "adult" channel content before that time in the evening. Other options include time-of-day, and time-of-week constraints, for which differing subscription rates might apply, etc.

Time limits on availability could also be implemented by active control for the head end, by the sending of specific add/remove control messages to the ONU to cause the permitted list to be updated. This would obviate the provision of a real-time clock in each ONU.

The permitted list used to vet channel request may be associated either with the ONU as a whole, and therefore apply equally to each STB or PC receiving service through it, or to each individual STB/PC receiving service. In the latter way, distinct STB's may have separate channel access controls applied to support, for example, parental control of children's viewing: STB's in children's rooms receive only channels targeted to children; "adult" material subscribed to is available only to adults in the household.

Figure 4:
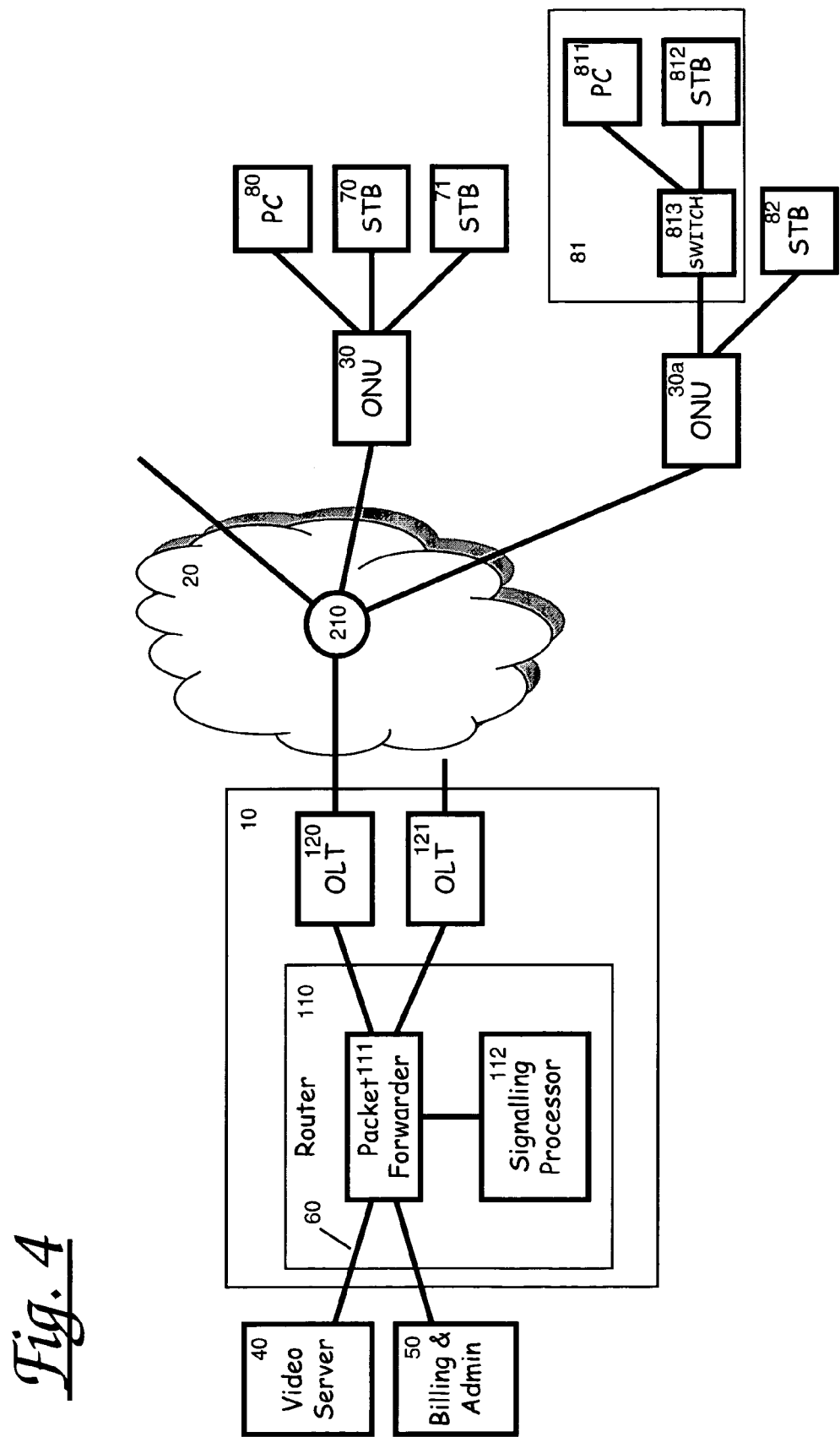
FIG. 4 shows a further schematic diagram of a telecommunications network in accordance with the present invention.

Referring now to FIG. 4, the invention described above is also not limited to the direct connection of individual STB's or PC's to the ONU. In a further embodiment shown in FIG. 4, a second ONU 30a is shown connected, via the access network, to OLT 120. The arrangement also has a customer premises network 81 connected to a user port on the ONU. The customer premises network comprises an STB 812 and a PC 811 connected via a switch 813 (for example an Ethernet switch) to the access connection to ONU 30a. In this way a single ONU may support several customer premises (for example in a multiple dwelling unit, or along a street). In such a configuration the ONU may comprise permitted channel lists per ONU customer port, or per STB/PC. Whilst this arrangement increases the complexity of the ONU, it reduces the number of ONU to be deployed thereby potentially reducing operator costs.

Furthermore, whilst the above description has been presented in terms of multi-cast signals and IGMP signaling and channels carried over IP, the underlying method of vetting channel requests from users is clearly independent both of the multi-cast nature of the signals requested—access to point-to-point signals in non-multi-cast networks can be controlled in the same way—and of the specific signaling and broadcast protocols used.

It will easily be seen that the present invention can be applied to other services delivered using multicast, such as audio, software distribution and general push-oriented content delivery.

Any range or device value given herein may be extended or altered without losing the effect sought, as will be apparent to the skilled person for an understanding of the teachings herein.

What is claimed is:

1. A network access unit for restricting user access to multicast signals transmitted on a local access network and comprising:
    a port for receiving a request from a user to join a multicast channel;
    a multicast channel request vetting unit for vetting the request with respect to a predetermined list of permitted multicast channels for that user;
    a transmitter for selectively forwarding the request responsive to the vetting when the list comprises the requested multicast channel;
    wherein the local access network is a shared medium access network.

2. A network access unit according to claim 1 additionally comprising:
    a receiver arranged to receive control signals from a network head end for updating the permitted list.

3. A network access unit according to claim 1 additionally in which a time is associated with at least one multicast channel in the predetermined list of multicast channels and in which the multicast channel vetting unit vets a request for the at least one multicast channel with respect to the time.

4. A network access unit according to claim 1 arranged to receive signals over an optical medium.

5. A customer premises equipment comprising a network access unit according to claim 1.

6. An optical access network comprising a network access unit according to claim 1.

7. A method of restricting user access to multicast signals transmitted on a local access network comprising the steps of:
    receiving a request to join a multicast channel from a user at a first port;
    vetting the request with respect to a predetermined list of permitted multicast channels for the user; and
    selectively forwarding the request responsive to the vetting when the list comprises the requested multicast channel,
    wherein the local access network is a shared medium access network.

8. A method according to claim 7 additionally comprising the steps of:
    receiving a control signal from a network head end;
    updating the permitted list responsive to the control signal.

9. A method according to claim 7 where additionally comprising the steps of:
    associating a time with at least one multicast channel in the predetermined list of channels; and
    vetting the request with respect to the time.

10. A method according to claim 7 in which the channel request is carried in an IGMP message.

11. A method of providing a secure multicast service over a shared medium access network, the method comprising:
    using an IGMP vetting function in customer premises equipment.

12. A method according to claim 11 comprising using a network receive address filter in said customer premises.

13. A program for a computer on a machine readable medium arranged to:
    receive a request to join a multicast channel over a shared access medium network from a user at a first port;
    vet the request with respect to a predetermined list of permitted multicast channels for the user;
    selectively forward the request responsive to the vetting when the list comprises the requested multicast channel.

* * * * *